United States Patent [19]
Hosokawa

[11] Patent Number: 5,061,111
[45] Date of Patent: Oct. 29, 1991

[54] METAL CONNECTOR FOR WOODEN BUILDING AND JOINTING STRUCTURE OF WOODEN BUILDING USING THE SAME

[76] Inventor: Kiyoshi Hosokawa, 779, Sasagase-Cho, Hamamatsu-shi, Shizuoka-ken, Japan

[21] Appl. No.: 636,804

[22] Filed: Jan. 2, 1991

[51] Int. Cl.$^5$ ............................................. B25G 3/00
[52] U.S. Cl. ................................. 403/232.1; 403/246; 403/187
[58] Field of Search ............... 403/256, 246, 245, 199, 403/187, 232.1; 5/298, 304

[56] References Cited

U.S. PATENT DOCUMENTS

| | | | |
|---|---|---|---|
| 201,343 | 3/1878 | Goebel | 403/256 X |
| 4,558,968 | 12/1985 | Melcki | 5/304 X |
| 4,616,950 | 10/1986 | Mirris | 403/232.1 X |
| 4,809,480 | 3/1989 | Hale | 403/199 X |
| 4,951,438 | 8/1990 | Thoresen | 403/187 X |

*Primary Examiner*—Andrew V. Kundrat
*Attorney, Agent, or Firm*—Sughrue, Mion, Zinn, Macpeak & Seas

[57] ABSTRACT

A metal connector and a jointing structure with which two wooden members are jointed to each other with a sufficient fastening strength. The metal connector comprises a metal connector body and a pair of driven wedges. The metal connector body includes a bottom plate, a core plate secured vertically to the bottom plate, and a pair of wedge guide elements secured to the opposite side faces of the core plate. The metal connector body is connected to one of a pair of wooden members to be jointed to each other and is closely fitted in a fitting recess formed in the other wooden member such that empty portions are formed in the fitting recess adjacent the wedge guide elements. The driven wedges are driven into the empty portions of the fitting recess along the wedge guide elements of the metal connector body, whereupon the other wooden member is forced to move toward the one wooden member until an end thereof is closely contacted with an end of the one wooden member thereby to firmly joint the two wooden members to each other.

11 Claims, 8 Drawing Sheets

METAL CONNECTOR FOR WOODEN BUILDING AND JOINTING STRUCTURE OF WOODEN BUILDING USING THE SAME

BACKGROUND OF THE INVENTION

1. Field of the Invention

This invention relates to improvements in or relating to a metal connector for a wooden building and also to a jointing structure of a wooden building using such metal connector.

2. Description of the Prior Art

A wooden building normally includes a large number of jointing structures at which two lumber blocks or wooden members are jointed to each other. Such jointing structures may be a jointing structure between a column and a beam, a jointing structure between a column and a sill, a jointing structure between a pair of beams extending in a serial direction or in perpendicular directions, a jointing structure at a principal rafter, that is, at tops of a pair of left and right diagonal members forming a triangle of a truss together with a beam, a jointing structure between an outer end portion of a diagonal member and a top end of a column, or the like.

Various means are conventionally employed to connect two lumber blocks to each other in those jointing structures, including notches, holes and so forth formed on lumber blocks, metal connectors such as nails, bolts and nuts, dowels and flange plates, and bonding agents, or any combination of those means.

The conventional connections have been developed and are adopted to joint general lumber members, that is, solid members to each other, and it is admitted that they exhibit anticipated effects as such.

The conventional connections, however, are not always satisfactory for a jointing structure in a large scale wooden building which draws much attention and is built recently and wherein structural assemblies are employed for main structural parts because they are not sufficient in binding strength or a metal connector is exposed to an outer side and presents a bad appearance.

SUMMARY OF THE INVENTION

It is an object of the present invention to provide a metal connector for a wooden building by which a jointing structure of any type not only in a wooden building which employs general lumber but also in a large scale wooden building which employs structural assemblies is provided with a satisfactory fastening strength without deteriorating the appearance.

It is another object of the present invention to provide a jointing structure which assures a sufficient fastening strength whether it is applied to a wooden building which employs general lumber or to a large scale wooden building which employs structural assemblies.

In order to attain the object, according to one aspect of the present invention, there is provided a metal connector for jointing first and second wooden members of a wooden building to each other, comprising a metal connector body including a bottom plate, a core plate secured vertically to an upper face of the bottom plate, and a pair of wedge guide elements secured to symmetrical locations on the opposite side faces adjacent a longitudinal end of the core plate, the first wooden member having a fitting recess formed at a jointing end thereof in a profile suitable to closely receive the bottom plate and core plate of the metal connector therein except that the fitting recess is expanded, at portions thereof adjacent the second wooden member in which the wedge guide elements are received, in the longitudinal direction of the core plate to form empty portions when the metal connector body is received in the fitting recess, the metal connector body being connected at the other longitudinal end thereof to the second wooden member, and a pair of driven wedges for being driven into the empty portions of the fitting recess along the wedge guide elements of the metal connector body to force the first wooden member toward the second wooden member until the jointing end is closely contacted with a jointing end of the second wooden member.

According to another aspect of the present invention to provide a jointing structure for a wooden building, comprising a metal connector body including a bottom plate, a core plate secured vertically to an upper face of the bottom plate, and a pair of wedge guide elements secured to symmetrical locations on the opposite side faces adjacent a longitudinal end of the core plate, first and second wooden members to be jointed to each other by means of the metal connector body, the first wooden member having a fitting recess formed at a jointing end thereof in a profile suitable to closely receive the bottom plate and core plate of the metal connector therein except that the fitting recess is expanded, at portions thereof adjacent the second wooden member in which the wedge guide elements are received, in the longitudinal direction of the core plate to form empty portions when the metal connector body is received in the fitting recess, means for connecting the other longitudinal end of the metal connector body to the second wooden member, and a pair of driven wedges for being driven into the empty portions of the fitting recess along the wedge guide elements of the metal connector body to force the first wooden member toward the second wooden member until the jointing end is closely contacted with a jointing end of the second wooden member.

With the metal connector and the jointing structure, the driven wedges are driven into the empty portions of the fitting recess of the first wooden member along the wedge guide elements of the metal connector body received in the fitting recess. Thereupon, the first wooden member is forced toward the second wooden member upon the jointing end thereof is closely contacted with and stopped by the jointing end of the second wooden member to which the metal connector body is secured. Consequently, the first and second wooden members are jointed firmly to each other at the jointing ends thereof. Accordingly, the metal connector and the jointing structure can provide a sufficient fastening strength between two wooden members not only in a wooden building which employs general lumber blocks but also in a large scale wooden building which employs structural assemblies. Besides, since the metal connector body is received in the fitting recess of the first wooden member, it will not deteriorate the appearance of the jointing structure.

The above and other objects, features and advantages of the present invention will become apparent from the following description and the appended claims, taken in conjunction with the accompanying drawings.

DESCRIPTION OF THE PREFERRED EMBODIMENTS

Figure 1:
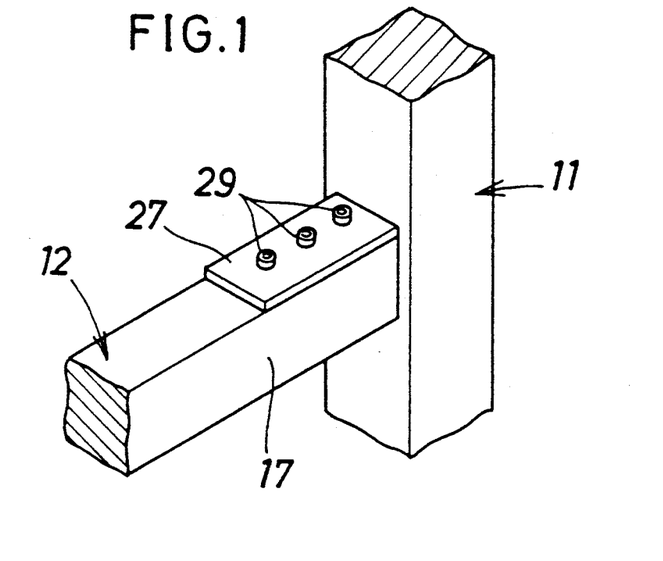
FIG. 1 is a perspective view of a metal connector and a jointing structure between a column and a beam using the metal connector showing a first embodiment of the present invention.
Figure 2:
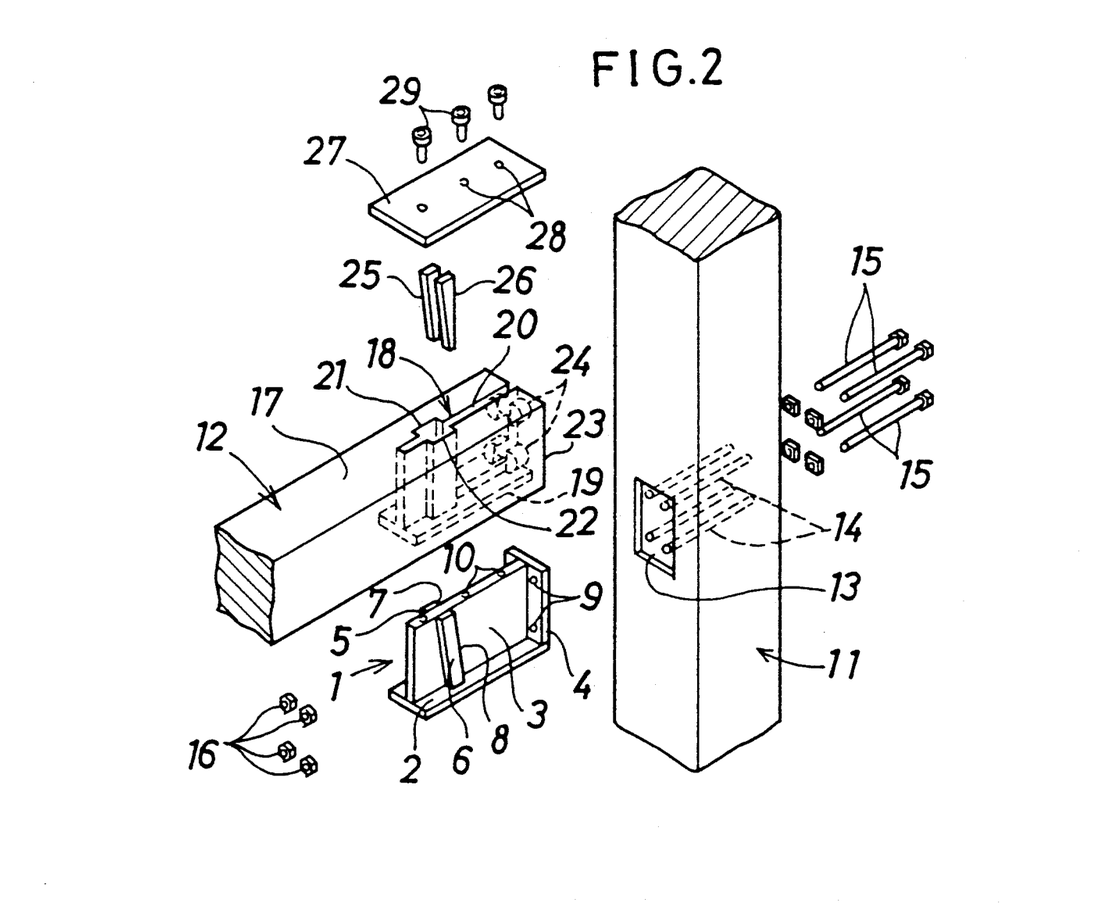
FIG. 2 is a fragmentary perspective view of the metal connector and jointing structure of FIG. 1.

Referring first to FIGS. 1 and 2, there are shown a metal connector and a jointing structure between a column and a beam using the metal connector according to a first preferred embodiment of the present invention. The metal connector shown includes a metal connector body 1 which includes a rectangular bottom plate 2, a rectangular core plate 3 secured uprightly to an upper face of the bottom plate 2 along a center line, a mounting plate 4 secured uprightly to a longitudinal end of the bottom plate 2 and held in contact with and secured to an end face of the core plate 3, and a pair of wedge guide elements 5 and 6 mounted at symmetrical locations on the opposite faces of the core plate 3 adjacent the other end remote from the mounting plate 4.

The mounting plate 4 has a width equal to the width of the bottom plate 2 and has a height equal to the height of the core plate 3.

The wedge guide elements 5 and 6 are mounted on the core plate 3 such that side faces 7 and 8 thereof opposing to the mounting plate 4 are inclined upwardly with respect to the mounting plate 4.

The mounting plate 4 has four bolt insertion holes 9 formed in two columns therein on the opposite sides of the core plate 3. Meanwhile, the core plate 3 has three threaded holes 10 formed in a predetermined spaced relationship on an upper end face thereof.

The metal connector body 1 can be produced readily by individually preparing the bottom plate 2, core plate 3, mounting plate 4 and wedge guide elements 5 and 6 and either assembling them by suitable means such as welding or fastening screws or molding or casting them as a unitary member.

The metal connector is used to joint a column 11 and a beam 12 to each other.

The column 11 has a recess 13 formed at a side face thereof at which it is to be jointed to the beam 12. The recess 13 has a sufficient size to receive therein the mounting plate 4 and the end portion of the bottom plate 2 on which the mounting plate 4 is mounted.

The column 11 has four bolt insertion holes 14 perforated therein in an aligned relationship to the bolt insertion holes 9 of the mounting plate 4. The bolt insertion holes 14 extend from the bottom of the recess 13 to the other face of the column 11.

The metal connector body 1 is attached in the following manner to the column 11.

Figure 3:
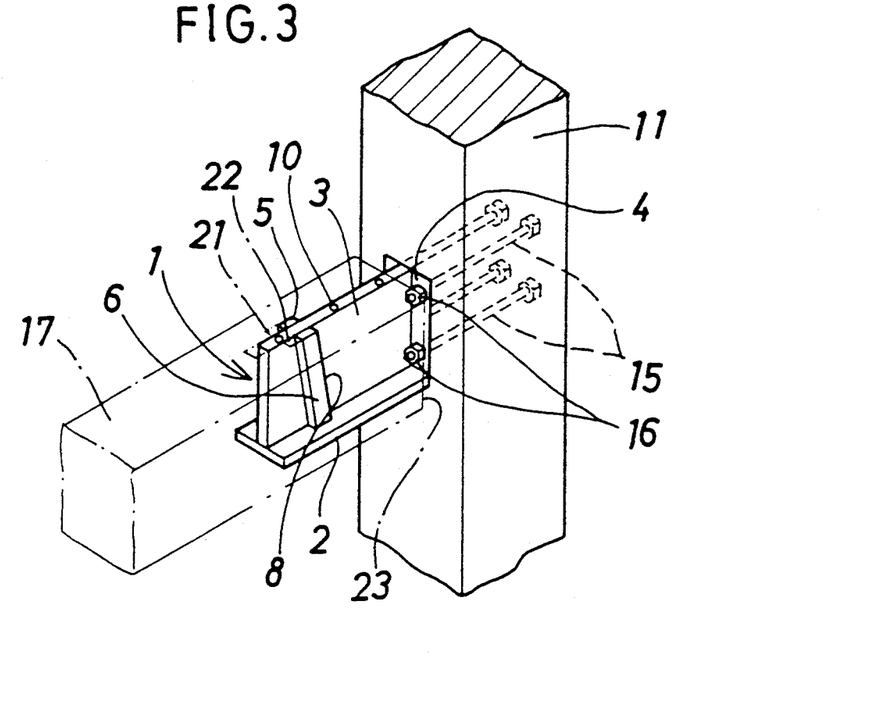
FIGS. 3 and 4 are perspective views illustrating different stages in assembling the jointing structure of FIG. 1.

In particular, the mounting plate 4 of the metal connector body 1 and the end of the bottom plate 2 at which the mounting plate 4 is received are first fitted into the recess 13 of the column 11, and then fastening bolts 15 are inserted into the bolt insertion holes 14 from the openings on the other face of the column 11 until threaded end portions thereof are projected from the bolt insertion holes 9 of the mounting plate 4. Then, fastening nuts 16 are screwed onto and tightened to the thus projected threaded end portions of the fastening bolts 15 to secure the metal connector body 1 horizontally to the column 11 as seen in FIG. 3.

The beam 12 is jointed at a jointing end portion 17 thereof to the column 11 by means of the metal connector body 1. In particular, referring to FIG. 2, the jointing end portion 17 of the beam 12 has a fitting recess 18 formed therein which has a substantially same profile as that of the metal connector body 1 except the mounting plate 4 and the end of the bottom plate 2 at which the mounting plate 4 is received. The fitting recess 18 is thus composed of a flattened recess 19 formed at the bottom of the jointing end portion 17 of the beam 12 and having a suitable size and shape to accept the bottom plate 2 of the metal connector body 1 therein, a vertical slot 20 formed along the center line in the jointing end portion 17 and having a suitable size and shape to accept the core plate 3 therein, and a pair of widened vertical slots 21 and 22 formed on the opposite sides of the vertical slot 20 and having a suitable size and shape to accept respectively therein the wedge guide elements 5 and 6 and a pair of driven wedges 25 and 26 which will be hereinafter described. The flattened recess 19, vertical slot 20 and widened vertical slots 21 and 22 are formed in a mutually contiguous relationship.

The flattened recess 19 is opened to the bottom face of the jointing end portion 17 of the beam 12 and also to a longitudinal end face 23 of the jointing end portion 17; the vertical slot 20 is opened to the top face and the longitudinal end face 23 of the jointing end portion 17; and the widened vertical grooves 21 and 22 are opened to the top face of the jointing end portion 17.

Two pairs of depressions 24 are formed on the longitudinal end face 23 of the jointing end portion 17 of the beam 12 for receiving therein the fastening nuts 16 screwed on the projected ends of the fastening bolts 15 from the bottom of the recess 13 of the column 11.

The beam 12 is jointed to the column 11 in the following manner.

First, the jointing end portion 17 of the beam 12 is placed from above onto the bottom plate 2 of the metal connector body 1 assembled to the column 11 such that the metal connector body 1 is received into the fitting recess 18 and the fastening nuts 16 are opposed to the depressions 24. In the thus placed position of the jointing end portion 17 of the beam 12, the top face of the beam 12, that is, the top face of the connecting end portion 17, and the top face of the metal connector body 1, or more particularly the top faces of the core plate 3 and wedge guide elements 5 and 6, are aligned with each other, and the top openings of the widened vertical slots 21 and 22 are empty at half portions thereof remote from the longitudinal end face 23 of the jointing end portion 17 as seen in FIG. 3.

Figure 4:
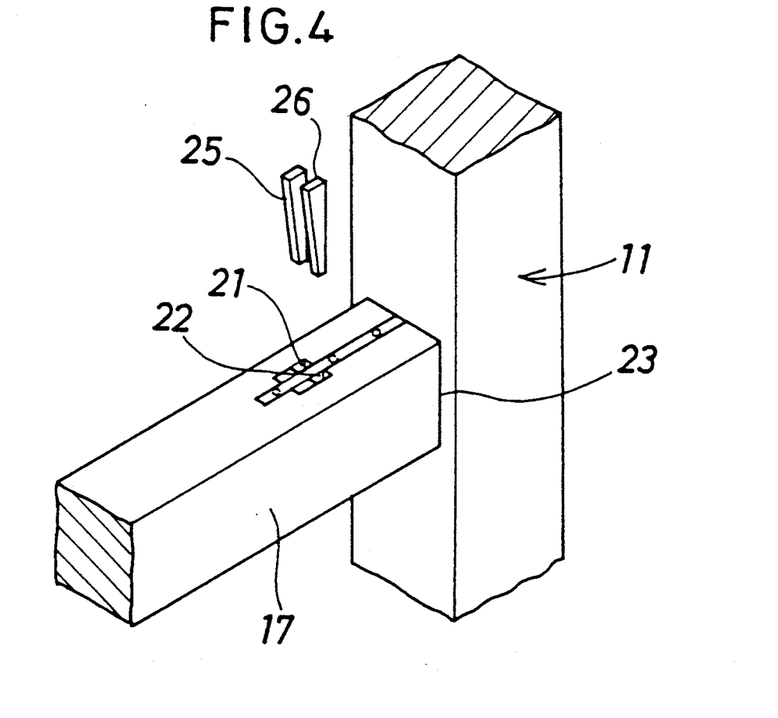

Subsequently, the entire beam 12 is moved axially toward the column 11 to displace the longitudinal end face 23 of the connecting end portion 17 thereof to a position very close to the bottom face of the recess 13 of the column 11. Consequently, the top openings of the widened vertical slots 21 and 22 are now emptied at half portions thereof adjacent the longitudinal end face 23 of the connecting end portion 17, that is, adjacent the column 11, as seen in FIG. 4.

Figure 5:
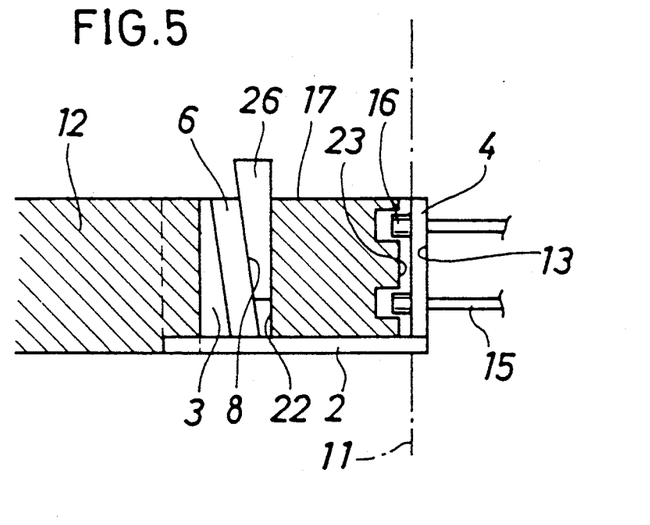
FIG. 5 is a sectional view showing illustrating a further stage in assembling the jointing structure of FIG. 1.

Then, a pair of driven edges 25 and 26 are driven into the thus emptied portions, that is, the half portions of the widened vertical slots 21 and 22 adjacent the column 11 with respect to the wedge guide elements 5 and 6, respectively, along the wedge guide elements 5 and 6 as seen in FIG. 5. As a result of such driving operation of the driven wedges 25 and 26, the entire beam 12 is forced to gradually move toward the column 11 until the longitudinal end face 23 of the jointing end portion 17 thereof is closely contacted with the bottom face of the recess 13 of the column 11.

Finally, a cover plate 27 is placed on the top face of the jointing end portion 17 of the beam 12 as seen in FIG. 1, and screws 29 are inserted into perforations 28 formed in the cover plate 27 and are screwed tightly into the threaded holes 10 at the top end of the core plate 3 as seen from FIG. 2.

While the jointing structure described above with reference to FIGS. 2 to 5 employs only one such metal connector as described above and joints a single column and a single beam to each other, a column to beam jointing structure may otherwise joint two, three or four beams to a column. In any case, each beam can be jointed to a column using such metal connector as described above. However, attention must be paid so that fastening bolts may not interfere with each other in the column.

Figure 6:
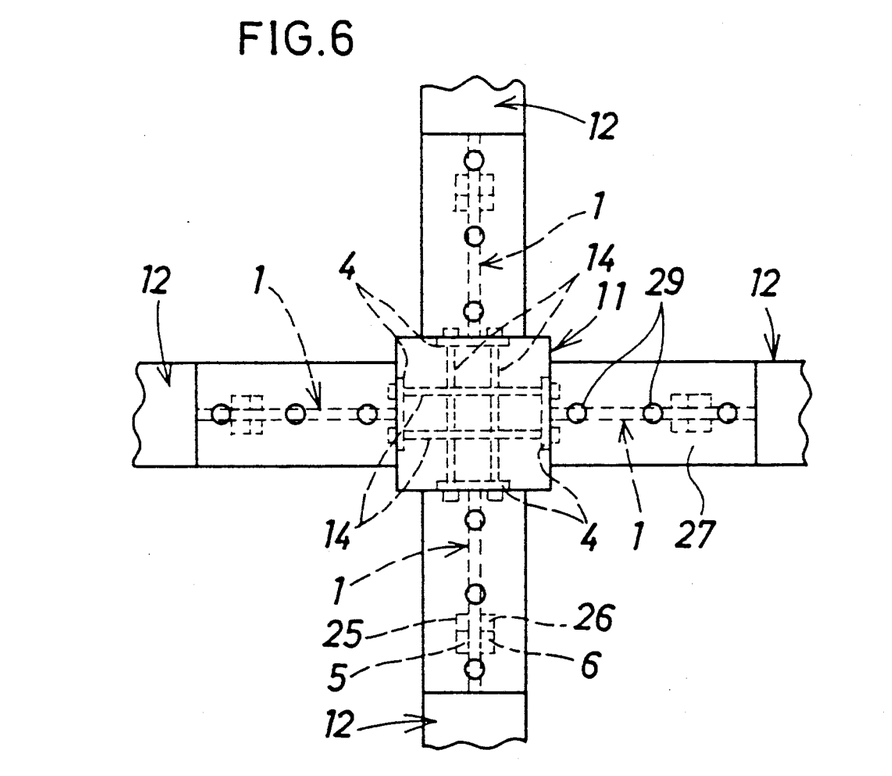
FIG. 6 is a plan view of another jointing structure wherein four beams are jointed to a column using the metal connector shown in FIG. 1.
Figure 7:
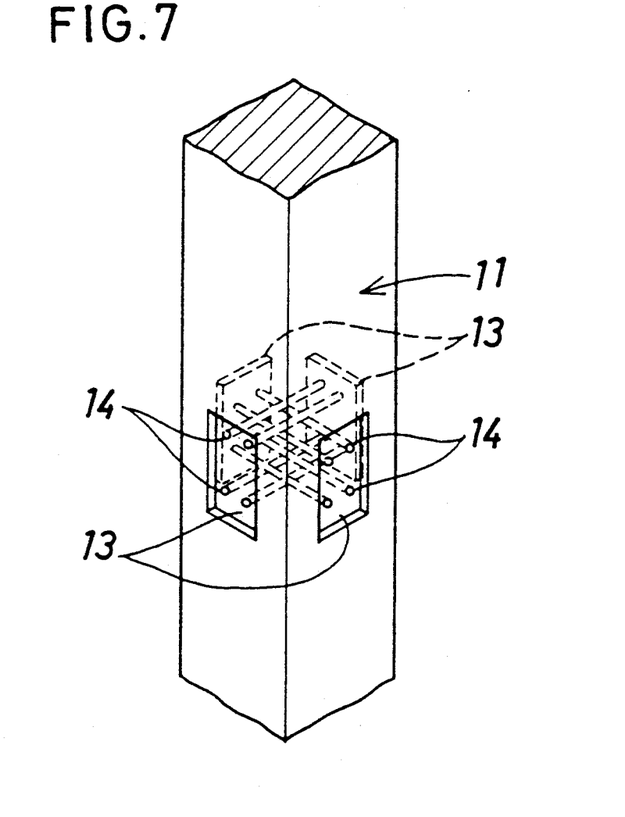
FIG. 7 is a perspective view of part of the column of FIG. 6.

Referring now to FIGS. 6 and 7, a jointing structure is shown wherein four beams are jointed to a single column in four directions. In the jointing structure shown, four beams 12 are jointed to four side faces of a single column 11 by means of respective metal connector bodies 1. Each two of the beams 12 in pair which are disposed on a straight line on the opposite sides of the column 11 are jointed to the column 11 by means of four fastening bolts 15 which extend between the mounting plates 4 of the associated metal connector bodies 1. The fastening bolts 15 are fitted in bolt insertion holes 14 of the column 11 and also in bolt insertion holes 9 of the mounting plates of the metal connector bodies 1 such that the fastening bolts 15 for ones of the two pairs of beams 12 on one straight line are located in a vertically offset relationship from the other fastening bolts 15 for the other pair of beams 12 on the other perpendicular straight line as seen in FIG. 7. Accordingly, the bolt insertion holes 14 and 9 are formed at such vertical offset locations as to provide such offset locations of the fastening bolts 15.

Figure 8:
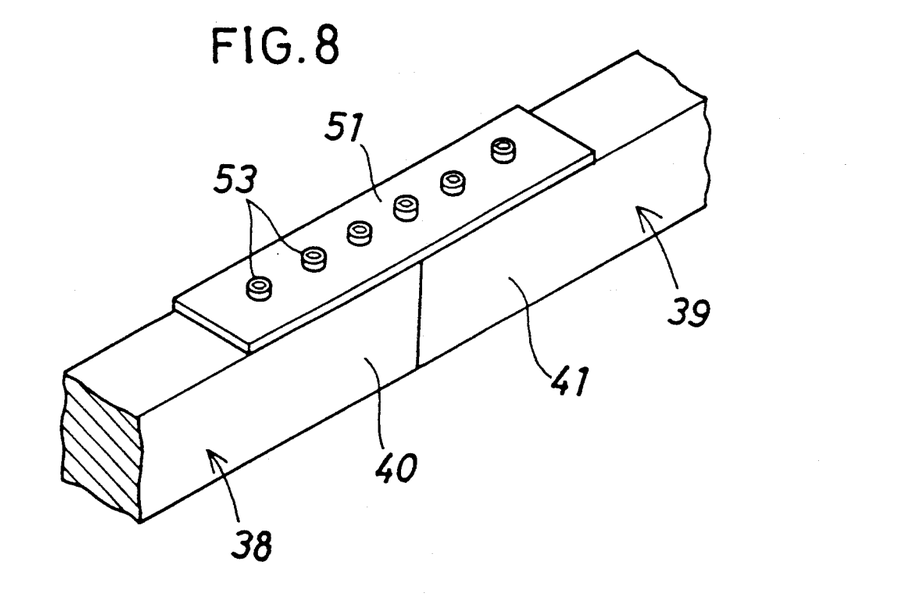
FIG. 8 is a perspective view of a metal connector and a jointing structure between two beams in a serial direction using the metal connector showing a second embodiment of the present invention.
Figure 9:
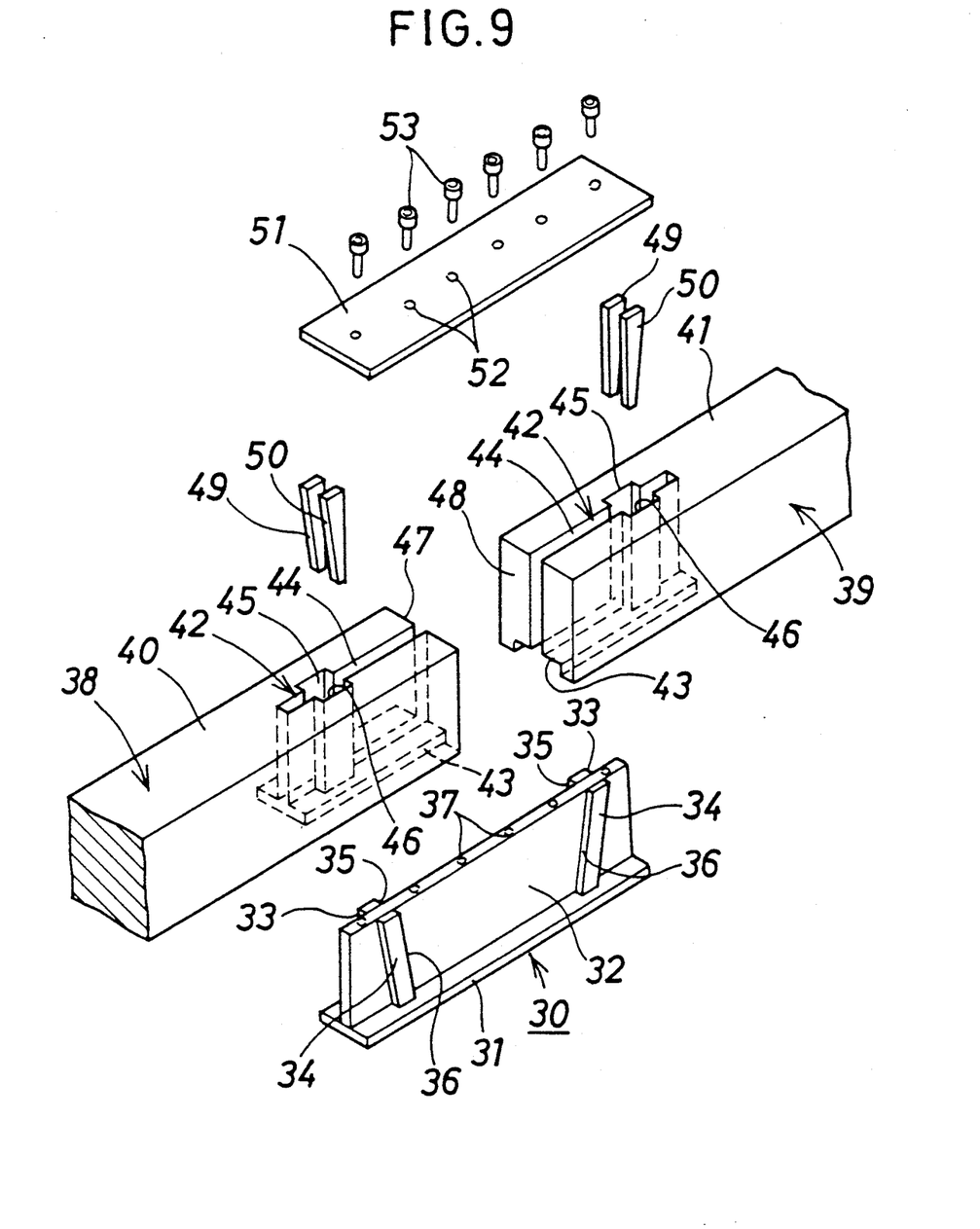
FIG. 9 is a fragmentary perspective view of the metal connector and jointing structure of FIG. 8.
Figure 10:
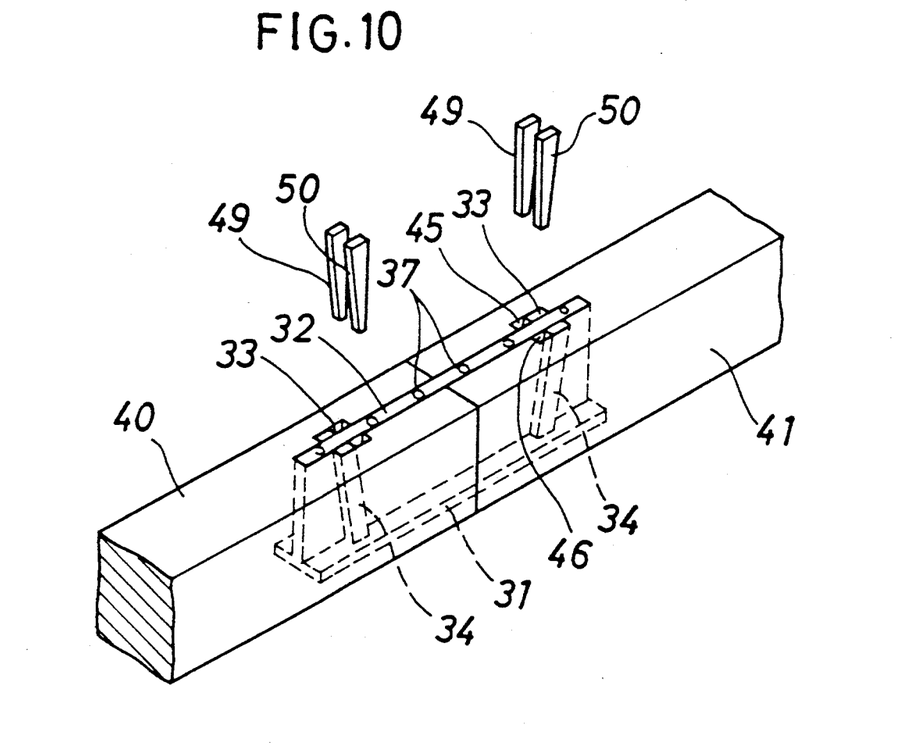
FIG. 10 is a perspective view illustrating an assembling step of the metal connector of FIG. 8.
Figure 11:
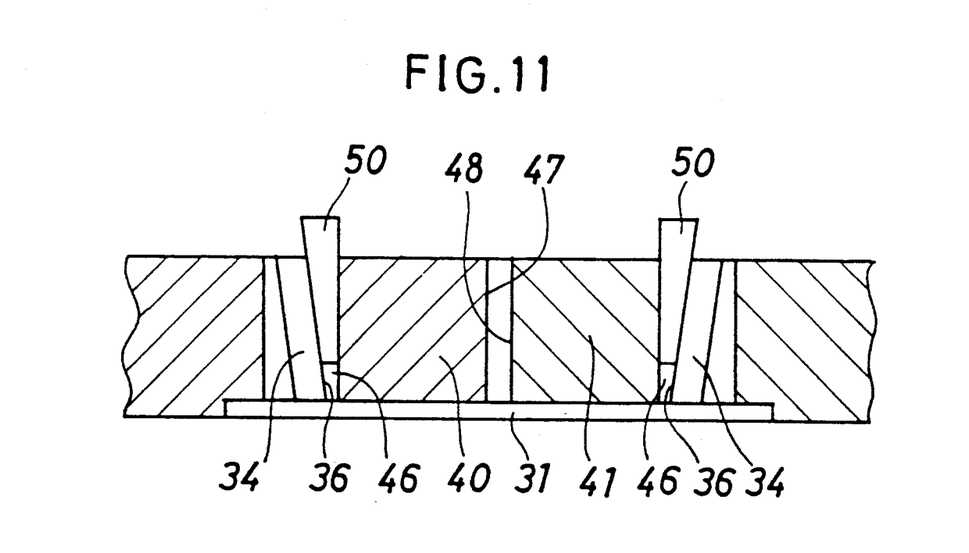
FIG. 11 is a sectional view illustrating another assembling step of the metal connector of FIG. 8.

Referring now to FIGS. 8 and 9, there are shown a metal connector and a jointing structure between two beams in a serial direction using the metal connector according to a second preferred embodiment of the present invention. The metal connector shown includes a metal connector body 30 which includes a rectangular bottom plate 31, a rectangular core plate 32 secured uprightly to an upper face of the core plate 32 along a center line, and two pairs of wedge guide elements 33 and 34 mounted at symmetrical locations of the opposite side faces adjacent the longitudinal opposite end portions of the core plate 32. Inner faces 35 and 36 of the wedge guide elements 33 and 34 which are opposed to each other are formed as upwardly inclined faces as seen in FIGS. 9, 10 or 11.

Several threaded holes 37 are formed in a predetermined spaced relationship at an upper end face of the core plate 32.

Similarly as in the case of the metal connector body 1 described hereinabove, the metal connector body 30 can be produced readily by individually preparing the bottom plate 31, core plate 32 and wedge guide elements 33 and 34 and either assembling them by suitable means such as welding or fastening screws or molding or casting them as a unitary member.

The metal connector is used to joint a pair of beams 38 and 39 to each other along a straight line.

The beams 38 and 39 are jointed at jointing end portions 40 and 41 thereof to each other by means of the metal connector body 30. In particular, referring to FIG. 9, the jointing end portions 40 and 41 of the beams 38 and 39 have a pair of fitting recesses 42 formed therein which generally have a substantially same profile as that of the metal connector body 30. Each of the fitting recesses 42 is thus composed of a flattened recess 43 formed at the bottom of the jointing end portion 40 or 41 of the beam 38 or 39 and having a suitable size and shape to accept a longitudinal half of the bottom plate 31 of the metal connector body 30 therein, a vertical slot 44 formed along the center line in the jointing end portion 40 or 41 and having a suitable size and shape to accept the core plate 3 therein, and a pair of widened vertical slots 45 and 46 formed on the opposite sides of the vertical slot 44 and having a suitable size and shape to accept respectively therein the wedge guide elements 33 and 34 and a pair of driven wedges 49 and 50 which will be hereinafter described. The flattened recess 43, vertical slot 44 and widened vertical slots 45 and 46 of each of the beams 38 and 39 are formed in a mutually contiguous relationship.

Each of the flattened recesses 43 is opened to the bottom face of the jointing end portion 40 or 41 of the beam 38 or 39 and also to a longitudinal end face 47 or 48 of the jointing end portion 40 or 41; each of the vertical slots 44 is opened to the top face and the longitudinal end face 47 or 48 of the jointing end portion 40 or 41; and each opposing ones of the widened vertical grooves 45 and 46 are opened to the top face of the jointing end portion 40 or 41.

The beams 38 and 39 are jointed to each other in the following manner.

First, the jointing end portions 40 and 41 of the beams 38 and 39 are placed from above onto the bottom plate 31 of the metal connector body 30 such that the metal connector body 30 is received into the fitting recesses 42 and a small gap is left between the longitudinal end faces 47 and 48 of the jointing end portions 40 and 41. In the thus placed positions of the jointing end portions 40 and 41 of the beams 38 and 39, the top faces of the connecting end portions 40 and 41, that is, the top faces of the beams 38 and 39, and the top face of the metal connector body 30, or more particularly the top faces of the core plate 32 and wedge guide elements 33 and 34, are aligned with each other, and the top openings of the widened vertical slots 45 and 46 are empty at half portions thereof adjacent the longitudinal end faces 47 and 48 of the jointing end portions 40 and 41 as seen in FIG. 10.

Subsequently, two pairs of driven edges 49 and 50 are driven into the thus emptied portions, that is, the half portions of the widened vertical slots 45 and 46 adjacent the longitudinal end faces 47 and 48 of the connecting end portions 40 and 41, respectively, as seen in FIG. 11. As a result of such driving operation of the driven wedges 49 and 50, the entire beams 38 and 39 are forced to gradually move toward each other until the longitudinal end faces 47 and 48 of the jointing end portions 40 and 41 thereof are contacted closely with each other.

Finally, a cover plate 51 is placed onto the top faces of the jointing end portions 40 and 41 of the beams 38 and 39 as seen in FIG. 8, and screws 53 are inserted into perforations 52 formed in the cover plate 51 and are screwed tightly into the threaded holes 37 at the top end of the core plate 32 as seen from FIG. 8.

Consequently, the two beams 38 and 39 are jointed to each other in a linear condition by means of the metal connector as seen in FIG. 8.

Figure 12:
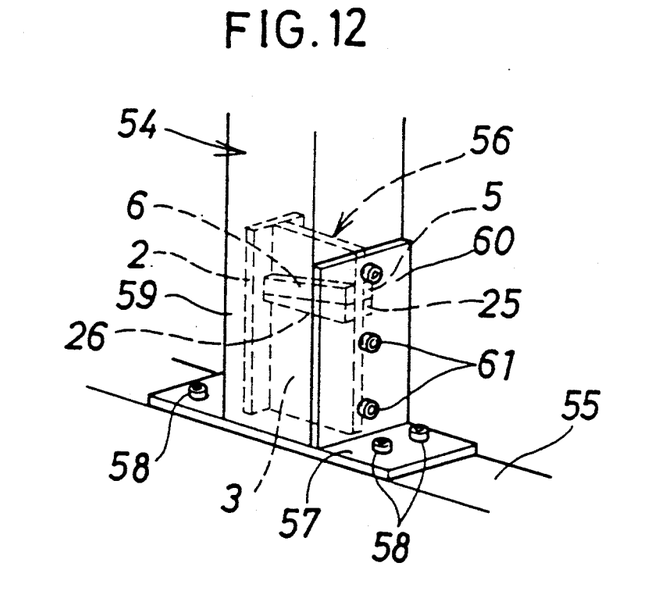
FIG. 12 is a perspective view of a metal connector and a jointing structure between a column and a sill using the metal connector showing a third embodiment of the present invention.

Referring now to FIG. 12, there are shown a metal connector and a jointing structure between a column and a sill using the metal connector according to a third preferred embodiment of the present invention. The metal connector shown includes a metal connector body 56 which is similar in construction to the metal connector body 1 of the first embodiment and can be regarded as a modification to the metal connector body 1 in that the mounting plate 4 of the metal connector body 1 is increased in size. In particular, while the mounting plate 4 of the metal connector body 1 has a width equal to the width of the bottom plate 2 and a height equal to the height of the core plate 2, the mounting plate 57 of the metal connector body 56 of the present embodiment has a width greater than the width of the bottom plate 2 and a height greater than the height of the core plate 3 such that it extends outwardly from the bottom plate 2 and core plate 3 as seen in FIG. 12.

The metal connector body 56 is secured to an upper face of a sill 55 by means of a plurality of fastening bolts 58.

A column 54 to be jointed to the sill 55 by means of the metal connector has a fitting recess formed at a contacting end portion 59, that is, a lower end portion thereof for receiving the metal connector body 56 in a similar manner as the fitting recess 18 of the beam 12 in the first embodiment described hereinabove. The metal connector body 56 is fitted in the fitting recess of the column 54, and a lower end face of the contacting end portion 59 of the column 54 is held in contact with the top face of the mounting plate 57 of the sill 55.

A cover plate 60 similar to the cover plate 27 of the metal connector in the first embodiment is fastened to the core plate 3 of the metal connector body 56 by means of a plurality of screws 61.

Figure 13:
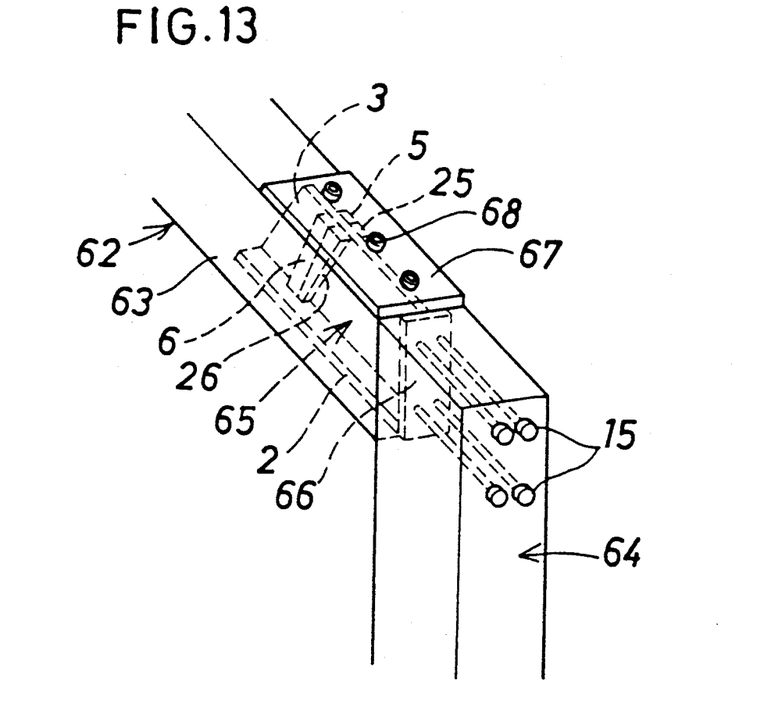
FIG. 13 is a perspective view of a metal connector and a jointing structure between an outer end of a diagonal member and an upper end of a column which form a principal rafter using the metal connector showing a fourth embodiment of the present invention.

Referring now to FIG. 13, there are shown a metal connector and a jointing structure between a diagonal member and a column using the metal connector according to a fourth preferred embodiment of the present invention. In particular, the jointing structure joints an inner face at an upper end of a column 64 to a lower end face of a jointing end portion 63, that is, an outer end portion of one 62 of a pair of left and right diagonal members which form a principal rafter, that is, a truss triangle, together with a beam not shown.

The metal connector in the present embodiment includes a metal connector body 65 which is similar in construction to the metal connector body 1 of the metal connector of the first embodiment and can be regarded as a modification to the metal connector body 1 in that the mounting plate 4 of the metal connector body 1 is inclined inwardly at a certain angle. In particular, while the mounting plate 4 of the metal connector body 1 in the first embodiment is erected uprightly at the right angle with respect to the bottom plate 2, the mounting plate 66 of the metal connector body 65 in the present embodiment is inclined to make an acute angle with respect to the bottom plate 2.

The metal connector body 65 is attached at the mounting plate 66 thereof to the inner face of the upper end of the column 64 in a similar manner as in the case of the metal connector body 1 in the first embodiment.

The diagonal member 62 has a fitting recess formed at a jointing end portion 63 thereof for receiving the metal connector body 65 in a similar manner as the fitting recess 18 in the first embodiment. The metal connector body 65 is thus fitted in the fitting recess of the diagonal member 65, and a lower end face of the jointing end portion 63 of the diagonal member 62 is held in contact with the inner face at the top end of the column 64.

A cover plate 67 similar to the cover plate 27 in the first embodiment is fastened to the metal connector body 65 by means of a plurality of screws 68.

Figure 14:
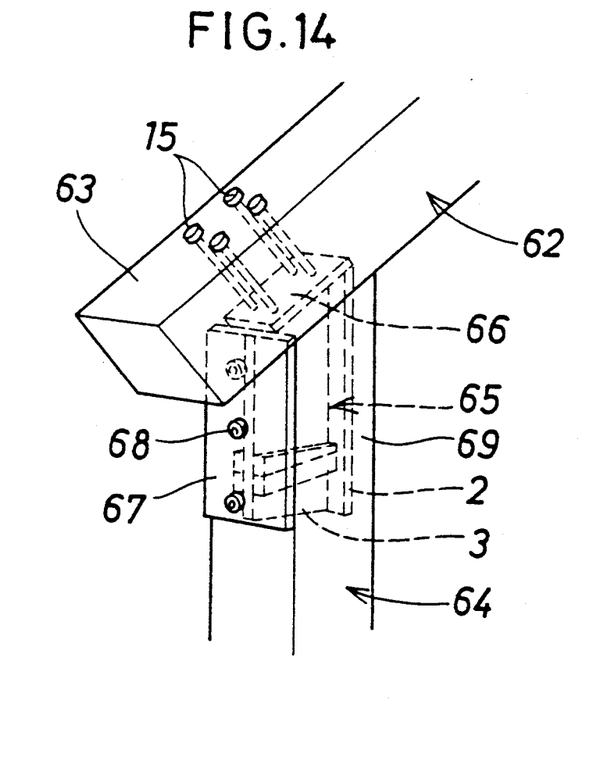
FIG. 14 is a perspective view of the metal connector of FIG. 13 but illustrating another jointing manner.

FIG. 14 shows another jointing structure between an upper end face of a column 64 and a lower side face of a jointing end portion 63, that is, an outer end portion of a diagonal member 62 similar to the diagonal member 62 shown in FIG. 13.

Referring to FIG. 14, the jointing structure shown includes such metal connector body 65 as described above. The metal connector body 65 is secured to a lower side face of the jointing end portion 63 of the diagonal member 62. The column 64 has a fitting recess formed at a jointing end portion 69, that is, an upper end portion thereof, and the metal connector body 65 is fitted in the fitting recess of the column 64.

Roughly speaking, the jointing structure shown in FIG. 14 is different from the jointing structure shown in FIG. 13 in that the metal connector body 65 is mounted not on the diagonal member 62 but on the column 64 and the fitting recess for receiving the metal connector body 65 is formed not in the column 64 but in the diagonal member 62.

Figure 15:
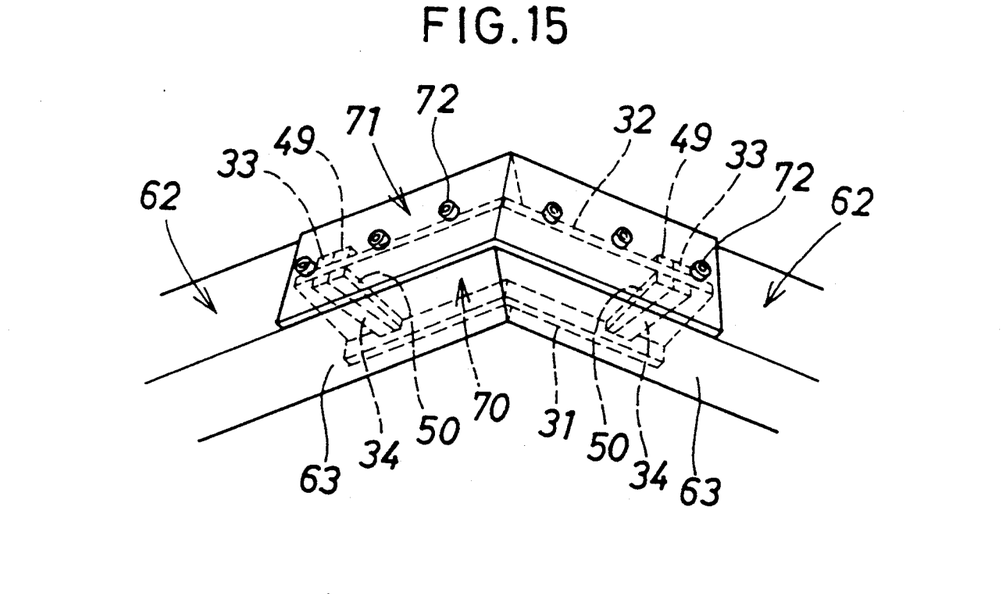
FIG. 15 is a perspective view of a metal connector and a jointing structure between top ends of a pair of left and right diagonal members which form a principal rafter using the metal connector showing a fifth embodiment of the present invention.

Referring now to FIG. 15, there are shown a metal connector and a jointing structure between a pair of diagonal members using the metal connector according to a fifth embodiment of the present invention. More particularly, the metal connector is used to joint top portions of a pair of left and right diagonal members 62 which form a principal rafter, that is, a truss triangle together with a beam.

The jointing structure is similar to the jointing structure between a pair of beams in a serial direction using the metal connector of the second embodiment shown in FIGS. 8 to 11. In particular, the jointing structure of the present embodiment is only different from the jointing structure in the second structure in that the metal connector of the present embodiment includes a metal connector body 70 which is bent in an inverted V-shape at an angle at which the diagonal members 62 are jointed to each other at jointing top portions thereof, and also a cover plate 71 is bent similarly in an inverted V-shape and mounted on a bent upper end face of the core plate 32 of the metal connector body 70 by means of screws 72.

Having now fully described the invention, it will be apparent to one of ordinary skill in the art that many changes and modifications can be made thereto without departing from the spirit and scope of the invention as set forth herein.

What is claimed is:

1. A metal connector for jointing first and second wooden members to each other, comprising:
   a metal connector body including a bottom plate, a core plate secured vertically to an upper face of said bottom plate, and a pair of wedge guide elements secured to symmetrical locations on the opposite side faces adjacent a longitudinal end of said core plate;
   said first wooden member having a fitting recess formed at a jointing end thereof in a profile suitable to closely receive said bottom plate and core plate of said metal connector therein except that said fitting recess is enlarged, at portions thereof adjacent said second wooden member in which said wedge guide elements are received, to form empty portions when said metal connector body is received in said fitting recess;
   said metal connector body being connected at the other longitudinal end thereof to said second wooden member; and
   a pair of driven wedges for being driven into said empty portions of said fitting recess along said wedge guide elements of said metal connector body to force said first wooden member toward said second wooden member until said jointing end is closely contacted with a jointing end of said second wooden member.

2. A metal connector as claimed in claim 1, further comprising a mounting plate secured to the other longitudinal end of said core plate of said metal connector body, and suitable numbers of fastening bolts and nuts for securing said metal connector body to said second wooden member.

3. A metal connector as claimed in claim 1, wherein said metal connector body has a second pair of wedge guide elements secured to symmetrical locations on the opposite faces adjacent the other longitudinal end of said core plate in a symmetrical relationship to the first-mentioned wedge guide elements with respect to a mid portion thereof in the longitudinal direction of said core plate, and further comprising a second pair of driven wedges for cooperating with said second pair of wedge guide elements to secure said metal connector body to said second wooden member in which a fitting recess similar to said fitting recess of said first wooden member is formed.

4. A metal connector as claimed in claim 3, wherein said metal connector body is bent in an inverted V-shape at the mid portion thereof in the longitudinal direction of said core plate.

5. A metal connector as claimed in claim 1, further comprising a cover plate mounted on an outer face adjacent said jointing end of said first wooden member and secured to an upper end face of said core plate of said metal connector body by means of a suitable number of screws.

6. A jointing structure for a wooden building, comprising:
   a metal connector body including a bottom plate, a core plate secured vertically to an upper face of said bottom plate, and a pair of wedge guide elements secured to symmetrical locations on the opposite side faces adjacent a longitudinal end of said core plate;
   first and second wooden members to be jointed to each other by means of said metal connector body;
   said first wooden member having a fitting recess formed at a jointing end thereof in a profile suitable to closely receive said bottom plate and core plate of said metal connector therein except that said fitting recess is enlarged, at portions thereof adjacent said second wooden member in which said wedge guide elements are received, to form empty portions when said metal connector body is received in said fitting recess;
   means for connecting the other longitudinal end of said metal connector body to said second wooden member; and
   a pair of driven wedges for being driven into said empty portions of said fitting recess along said wedge guide elements of said metal connector body to force said first wooden member toward said second wooden member until said jointing end is closely contacted with a jointing end of said second wooden member.

7. A jointing as claimed in claim 6, wherein said connecting means includes a mounting plate secured to the other longitudinal end of said core plate of said metal connector body, and suitable numbers of fastening bolts and nuts for securing said metal connector body to said second wooden member.

8. A metal connector as claimed in claim 6, further comprising a cover plate mounted on an outer face adjacent said jointing end of said first wooden member and secured to an upper end face of said core plate of said metal connector body by means of a suitable number of screws.

9. A metal connector as claimed in claim 6, wherein said second wooden member has a fitting recess formed at a jointing end thereof which is similar to said fitting recess of said first wooden member, and said connecting means includes a second pair of wedge guide elements secured to symmetrical locations on the opposite faces adjacent the other longitudinal end of said core plate, and a second pair of driven wedges for being driven into the empty portions of said fitting recess of said second wooden member along said second pair of wedge guide elements to force said second wooden member toward said first wooden member until said jointing end is closely contacted with said jointing end of said first wooden member.

10. A metal connector as claimed in claim 9, wherein said metal connector body is bent in an inverted V- shape at a mid portion thereof in the longitudinal direction of said core body.

11. A metal connector as claimed in claim 9, further comprising a cover plate mounted on outer faces adjacent said jointing ends of said first and second wooden members and secured to an upper end face of said core plate of said metal connector body by means of a suitable number of screws.

* * * * *